United States Patent Office 3,823,104
Patented July 9, 1974

---

3,823,104
SOLID FOAMS AND THEIR PREPARATION
Clemens Bondy, Harlow, and Ian Christopher Tallack, Southampton, England, assignors to Doverstrand Ltd., Temple Fields, Harlow, Essex, England
No Drawing. Continuation-in-part of abandoned application Ser. No. 34,864, May 5, 1970. This application Aug. 30, 1972, Ser. No. 284,796
Claims priority, application Great Britain, May 5, 1969, 22,865/69
Int. Cl. C08j 1/16
U.S. Cl. 260—2.56                                    11 Claims

ABSTRACT OF THE DISCLOSURE

In the preparation latex rubber foams utilizing non-ionic surfactants, foam stability is enhanced by the use of a fatty stabilizer blend which contains both normally liquid and normally solid fatty components, the blend itself being normally liquid. The fatty components of the blend are selected from the group consisting of saturated and unsaturated fatty alcohols, saturated and unsaturated fatty acid amides and mixtures thereof.

---

CROSS-REFERENCE TO RELATED APPLICATIONS

This application is a continuation-in-part of applicants' copending application, Serial No. 34,864 entitled Solid Foams and Their Preparation, filed on May 5, 1970 and now abandoned.

BACKGROUND OF THE INVENTION

1. Field of the Invention

This invention relates to the preparation of foams from foamable latices of synthetic polymers and is concerned with the production of foams which do not exhibit substantial coarsening of their cell structure on standing for extended periods of time.

2. Description of the Prior Art

In the production of dry foams from polymer latices it is necessary first to create a cellular structure by introducing a gas into the liquid latex and secondly to maintain the required fine foamed structure during drying and any subsequent operations. Liquid froths are inherently liable to coarsening and collapse by the bursting of primary cells, and several methods have been devised for preventing such collapse during the critical stage of drying.

In one of the earliest proposed processes for the manufacture of dry foam from latex, frothing aids, such as soap or saponin, together with thickeners, such as gelatin were added to the latex in quantities sufficient to retard collapse of the cellular structure, but the liquid foams so produced showed noticeable coarsening after standing at room temperature for 60 minutes, and (especially in the presence of conventional curing agents) could not be restored to the original fine cellular structure by re-foaming.

In another previously proposed process, the frothed latex was gelled by the addition of delayed-action coagulants such as sodium silicofluoride, but this process was largely dependent upon the type of emulsifier used in the preparation of the polymer latex and required very careful control of pH, time and temperature during the gelation step.

Yet another previously proposed process, required the use of a reactive polymer with an added co-reactive material to effect gelation of the foam before drying, but the latex, after the addition of the co-reactive material, was not storage-stable and became unusable after 3 or 4 days.

SUMMARY OF THE INVENTION

We have now discovered that the stabilization of latex foams can be greatly enhanced, and the foams dried without noticeable change in structure and without the use of thickeners, by the addition to the latex of blends of certain saturated or unsaturated fatty alcohols and fatty acid amides.

DETAILED DESCRIPTION OF THE INVENTION

Accordingly, one aspect of the present invention provides a method of making a solid foam, comprising the steps of (a) preparing an aqueous dispersion comprising a film-forming polymer, not less than 1.0% by weight of a non-ionic surfactant, and from 0.5% to 7.5% by weight of a blend of saturated or unsaturated fatty alcohols having from 8 to 20 carbon atoms and/or a blend of fatty acid amides of the formula $RCONR^1R^2$ in which $R^1$ and $R^2$ are each a hydrogen atom, or an alkyl or hydroxyalkyl group containing from 1 to 6 carbon atoms and R is a saturated or unsaturated linear aliphatic group containing from 8 to 20 carbon atoms; (b) foaming the said dispersion; (c) spreading the resulting foam to form a layer not more than 15 mm. in thickness; and (d) drying the said foam.

Certain lower members of the above defined fatty alcohols and fatty acid amides are liquid at room temperature and, by themselves, may function as foam depressants rather than as foam stabilizers. Certain higher members, especially those containing alkyl as distinct from alkenyl groups, are solids at room temperature and, by themselves, cannot be conveniently used as latex additives and if used do not function effectively as foam stabilizers. It is therefore important that low melting point blends of the normally solid members or blends of normally liquid members together with normally solid members, which blends are themselves liquid at ambient operating temperatures (usually 15°–30° C.) are used as these blends have been found to be excellent foam stabilizers, possessing advantages over the surface-active agents used hitherto in the manufacture of dry foams from polymer latices. The blend of fatty alcohols and/or fatty acid amides is therefore preferably a blend of those alcohols or amides which are liquid at 18° C. with those alcohols or amides which are solid at 18° C., the blend itself being liquid at 18° C. More particularly, the stabilizer blend is preferred to contain at least about 10% by weight of components which are liquid at 18° C. and at least about 10% by weight of components which are solid at 18° C. It is still further preferred that the stabilizer blend, which itself must be liquid at 18° C., contain at least about 15% by weight normally liquid components and at least about 20% by weight normally solid components.

Because the fatty alcohols and the fatty acid amides appear to function in the same manner, blends containing both chemical types may be utilized in accordance with the invention as well as blends of only a single type. The amount of the blend to be added to the polymer latex is from 0.5 to 7.5% by weight, and preferably from 1.0 to 3.0% by weight based on the latex.

A non-ionic surface-active agent is used in conjunction with the aforesaid blend. Such surface-active agents, examples of which are the condensation products of a fatty alcohol and alkylene oxides, are conventionally used in an emulsion polymerization process by which the latex may be formed and may therefore be already present in sufficient quantity in the polymer latex so that it may not be necessary to add any non-ionic surface-active agent to the latex.

The present method is not dependent upon the nature of the polymer in the latex employed. Typically, however, the latex will comprise polymers or copolymers of monomers selected from esters of acrylic acid, esters of methacrylic acid, styrene, butadiene, isoprene, vinyl acetate, acrylonitrile, vinyl halides and vinylidene halides. The polymer may, but need not, contain copolymerized functional groups such as carboxylic acid or amine groups. In the case where the polymer contains copolymerized functional groups, cross-linking or curing of the polymer may be effected with a co-reactive material, such as a melamine-formaldehyde. In either case, the polymer may be cured, if desired, by heat. The latex may be compounded with fillers, pigments, plasticizers, antioxidants, curing agents, etc. in accordance with common practice.

The foams produced by the present method may be supported or unsupported. Unsupported foams will normally be cast or spread onto a substrate from which the foam can be readily removed after it has been dried and, optionally, cured by heat, but it is preferred to produce a supported foam by casting or spreading the foamed latex onto a substrate such as a woven or non-woven fibrous textile web. After casting, the foam is dried and optionally cured at a temperature and for a time appropriate for the particular polymer from which the latex is formed. The resulting foams are of fine, smooth appearance and handle and have good resistance to abrasion.

The following Examples illustrate the practice of the invention.

Example 1

To a latex with a solids content of 55% by weight, the solid component consisting of 87.5% by weight of ethyl acrylate, 10% of acrylonitrile and 2.5% of methylol acrylamide, were added for every 100 parts by weight of polymer solids 1.5 parts by weight of polyethoxylated cetyl alcohol having about 60 molar units of ethylene oxide, and 4.5 parts by weight of a liquid mixture of fatty alcohols of chain lengths varying from 8 to 18 carbon atoms, the composition by weight of the total of the mixture being as follows: $C_8=5$ to 8%, $C_{10}=5$ to 7%, $C_{12}=46$ to 52%, $C_{14}=14$ to 20%, $C_{16}=8$ to 10%, $C_{18}=8$ to 11% of total. To this mixture was added 10 parts by weight of a pigment grade of rutile titanium dioxide and 40 parts by weight of fine talc, and the whole blended with a high-speed stirrer.

The composition was then frothed to five times its original volume by means of a planetary mixer. Part of the foam was spread onto a woven rayon fabric to a thickness of 5 mm. and placed in an oven at a temperature of 150° C. for 10 minutes. The resultant dry foam was white, soft and flexible, and had a fine uniform cellular structure.

Another portion of the same wet foam was allowed to stand for 30 hours, after which time it showed no measurable diminution in volume.

Example 2

A latex of 56% by weight solids polymer content, in which the polymer was prepared by emulsion polymerization of a monomer mixture consisting by weight of 50% butadiene, 27.5% of styrene, 20% of acrylonitrile and 2.5% of itaconic acid, was compounded with the same ingredients and in the same proportions as given in Example 1, and the composition foamed to give a wet froth of excellent stability and uniform fine structure which, after spreading and heating, yielded a dry foam of good apperance and properties.

Example 3

An ammoniated centrifuged natural rubber latex of 60% by weight solids content was compounded with the same ingredients and in the same proportions as given in Example 1, and to the mixture were added 1.5 parts by weight of sulphur, 2 parts by weight of zinc oxide, 1 part by weight of zinc dibutyl dithiocarbamate and 0.5 part by weight of mercaptobenzthiazyl disulphide (all being parts per 100 parts by weight of dry rubber).

The final composition was foamed as described in Examples 1 and 2, producing a very stable wet froth which, after spreading and heating, yielded a dry foam of excellent structure and properties.

Example 4 (Comparative)

To the polymer latex of Example 1 were added, for each 100 parts by weight of polymer solids, 1.5 parts by weight of polyethoxylated cetyl alcohol having about 60 molar units of ethylene oxide, and 4.5 parts by weight of a mixture of fatty alcohols of chain lengths varying from 10 to 18 carbon atoms, the composition by weight of the total of the mixture being as follows: $C_{10}=6$ to 10%, $C_{12}=47$ to 53%, $C_{14}=16$ to 20, $C_{16}=8$ to 12%, $C_{18}=8$ to 12%. To this mixture were added 10 parts by weight of titanium dioxide and 40 parts by weight of whiting, and the whole blended by means of a high-speed stirrer.

The composition was frothed and spread as described in Example 1, but on heating at 150° C. the froth collapsed yielding a thin layer of coarse-structured hard polymer.

The mixture of fatty alcohols of this example was solid at room temperature (18° C.) and was introduced into the latex mixture by heating to 25° C. and stirring the molten mixture rapidly into the latex. This example illustrates the need for using a normally liquid mixture of fatty alcohols.

Example 5

To a latex with a solid content of 55% by weight, the solid component consisting of 87.5% by weight of ethyl acrylate, 10% of acrylonitrile and 2.5% of methylol acrylamide, were added for every 100 parts by weight of polymer solids 1.5 parts by weight of polyethoxylated cetyl alcohol having about 60 molar units of ethylene oxide, and 4.5 parts by weight of a liquid blend of fatty acid diethanolamides of chain length varying from 14 to 18 carbon atoms as follows: $C_{14}=2-5\%$ of total, $C_{16}=8-15\%$ of total, $C_{18}=80-90\%$ of total.

The above-described blend consisted of a mixture of the amides of myristic, palmitic, stearic and oleic acids, the oleic acid amide content of which exceeded 10% by weight of the blend, thereby rendering the mixture normally liquid. Iodine number of the blend was 86–90.

To this mixture was added 10 parts by weight of a pigment grade of rutile titanium dioxide and 40 parts by weight of fine talc, and the whole blended with a high-speed stirrer.

The composition was then frothed to five times its original volume by means of a planetary mixer. Part of the foam was spread onto a woven rayon fabric to a thickness of 5 mm. and placed in an oven at a temperature of 150° C. for 10 minutes. The resultant dry foam was white, soft and flexible, and had a fine uniform cellular structure.

Another portion of the same wet foam was allowed to stand for 30 hours, after which time it showed no measurable diminution in volume.

What is claimed is:

1. A method of making a solid foam, comprising the steps of (a) preparing an aqueous dispersion comprising a film-forming polymer, not less than 1.0% by weight of a non-ionic surfactant, and from 0.5% to 7.5% by weight of a normally liquid blend of both normally liquid and normally solid fatty components selected from the group consisting of (1) saturated and unsaturated fatty alcohols having from 8 to 20 carbon atoms, (2) saturated and unsaturated fatty acid amides of the formula $RCONR^1R^2$ in which $R^1$ and $R^2$ are selected from the group consisting of hydrogen and alkyl and hydroxyalkyl groups having from 1 to 6 carbon atoms and R is an aliphatic group selected from the group consisting of $C_{8-20}$ alkyl and alkenyl and (3) mixtures thereof, wherein the blend of normally liquid and normally solid components is liquid at 18° C., and the fatty components of the blend consist essentially of at least about 10% by weight components which are normally liquid at 18° C., the remainder of the blend consisting of at least about 10% by weight fatty components which are normally solid at 18° C.; (b) foaming said dispersion; (c) spreading the resulting foam to form a layer not more than 15 mm. in thickness; and (d) drying said foam.

2. A method as claimed in Claim 1, wherein the amount of said stabilizer is from 1.0 to 3.0% by weight.

3. A method as claimed in Claim 1, wherein the film-forming polymer is a polymer or copolymer of monomers selected from esters of acrylic acid, esters of methacrylic acid, styrene, butadiene, isoprene, vinyl acetate, acrylonitrile, vinyl halides and vinylidene halides.

4. A method as claimed in Claim 1, wherein the latex polymer contains copolymerized functional groups.

5. A method as claimed in Claim 4, wherein the polymer is cured or cross-linked with a material co-reactive with the functional groups.

6. A method as claimed in Claim 1, wherein the polymer is cured by heat.

7. A method as claimed in Claim 1, wherein the foam is spread onto a substrate from which it is removed after drying.

8. A method as claimed in Claim 1, wherein the foam is spread onto a woven or non-woven textile web.

9. A solid foam made by the method claimed in Claim 1.

10. A substrate of woven or non-woven textile material having a solid foam as claimed in Claim 9 adherent thereto.

11. A method as claimed in Claim 7, wherein additionally after drying, said foam is cured.

References Cited
UNITED STATES PATENTS
3,491,033   1/1970   Dunn _____ 260—2.5 L MORTON FOELAK, Primary Examiner U.S. Cl. X.R.

117—140 A, 146; 260—2.5 R, 2.5 H, 2.5 HB, 2.5 N, 4 R, 29.4 UA, 29.4 ME, 29.6 A, 29.6 MN, 29.7 E, 29.7 NE, 723